US 9,049,735 B2

(12) United States Patent
Balakrishnan et al.

(10) Patent No.: US 9,049,735 B2
(45) Date of Patent: Jun. 2, 2015

(54) METHOD AND APPARATUS TO FACILITATE MOBILE RELAY AND GROUP MOBILITY

(75) Inventors: Ravikumar Balakrishnan, Atlanta, GA (US); Xiangying Yang, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1104 days.

(21) Appl. No.: 13/049,530

(22) Filed: Mar. 16, 2011

(65) Prior Publication Data

US 2012/0082084 A1    Apr. 5, 2012

Related U.S. Application Data

(60) Provisional application No. 61/389,080, filed on Oct. 1, 2010.

(51) Int. Cl.
| | |
|---|---|
| *H04W 72/12* | (2009.01) |
| *H04W 8/24* | (2009.01) |
| *H04W 76/04* | (2009.01) |
| *H04W 88/06* | (2009.01) |

(52) U.S. Cl.
CPC .......... *H04W 72/1215* (2013.01); *H04W 8/245* (2013.01); *H04W 76/048* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2005/0282548 | A1* | 12/2005 | Kim et al. | 455/436 |
| 2008/0045215 | A1* | 2/2008 | Chen et al. | 455/435.2 |
| 2010/0061339 | A1* | 3/2010 | Kim et al. | 370/331 |
| 2010/0323749 | A1* | 12/2010 | Lee et al. | 455/524 |
| 2011/0103347 | A1* | 5/2011 | Dimou | 370/331 |
| 2012/0002589 | A1* | 1/2012 | Saifullah et al. | 370/315 |
| 2013/0021940 | A1* | 1/2013 | Keskitalo | 370/252 |

OTHER PUBLICATIONS

"Part 16: Air Interface for Fixed and Mobile Broadband Wireless Access Systems", Draft Amendment to IEEE Standard for Local and metropolitan area networks, Advanced Air Interface (working document), Oct. 14, 2009, 621 pages.

* cited by examiner

*Primary Examiner* — Jae Y Lee
*Assistant Examiner* — Tito Pham
(74) *Attorney, Agent, or Firm* — Schwabe, Williamson & Wyatt, P.C.

(57) ABSTRACT

A method and system to facilitate mobile relay and group mobility in a wireless network. In one embodiment of the invention, the wireless network facilitates a mobile relay station that has logic to switch communication with a first base station to a second base station while maintaining logical communication with its associated mobile station(s). By doing so, the handover of the mobile relay station from a source base station to a target base station is transparent to the mobile station(s) that are connected with the mobile relay station in one embodiment of the invention.

4 Claims, 7 Drawing Sheets

100

200

METHOD AND APPARATUS TO FACILITATE MOBILE RELAY AND GROUP MOBILITY

REFERENCE TO RELATED INVENTIONS

This is a non-provisional application corresponding to provisional application Ser. No. 61/389,080 filed Oct. 1, 2010, and claims the priority of that filing date for all common subject matter.

FIELD OF THE INVENTION

This invention relates to a relay station, and more specifically but not exclusively, to a method and apparatus to facilitate mobile relay and group mobility in a wireless network.

BACKGROUND DESCRIPTION

In a wireless network, the addition of relay stations or relay nodes can enhance the wireless network. For example, the relay station can increase the network capacity by increasing the frequency reuse in the wireless network. Both the base station and the relay station in a given area can communicate with different mobile stations using the same frequency resources. Relay stations can also provide improved coverage with lesser deployment costs as compared with a femto base station in a femtocell environment. This is because the relay station can use wireless backhaul links to allow communication of the mobile stations with the wireless network.

FIG. 1 illustrates a prior art wireless network 100. The stationary relay station 110 can intelligently relay data between the stationary mobile station 140 and the base station 120 via the wireless link 118 and the wireless General Routing Encapsulation (GRE) communication tunnel 3 116 respectively. The base station 120 is connected with an access serving network 130 via the wireless GRE communication tunnels 1 112 and 2 114 respectively. The relay station 110 can be deployed in an ad-hoc manner in areas such as the cell edge or cell shadow of the network where the base station 120 cannot provide sufficient coverage.

BRIEF DESCRIPTION OF THE DRAWINGS

The features and advantages of embodiments of the invention will become apparent from the following detailed description of the subject matter in which.

DETAILED DESCRIPTION

Figure 1:
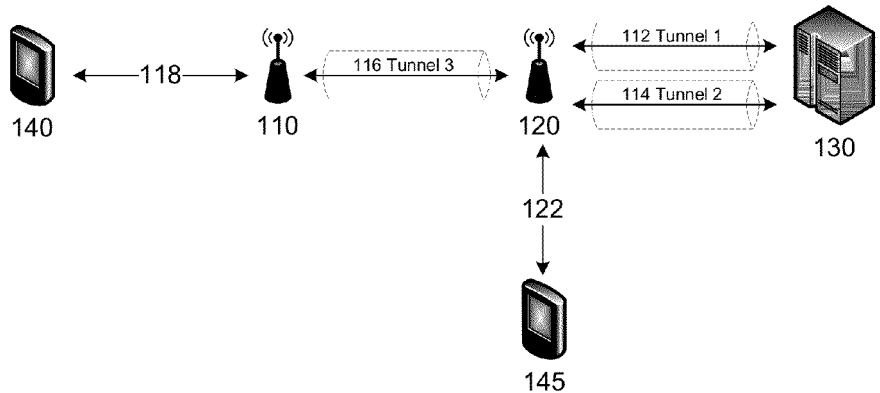
FIG. 1 illustrates a prior art wireless network 100.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus to facilitate mobile relay and group mobility in a wireless network. In one embodiment of the invention, the wireless network facilitates a mobile relay station that has logic to switch communication with a first base station to a second base station while maintaining logical communication with its associated mobile station(s). By doing so, the handover of the mobile relay station from a serving base station to a target base station is transparent to the mobile station(s) that are connected with the mobile relay station in one embodiment of the invention.

The group mobility of the relay station and its associated mobile stations facilitates usage scenarios such as high speed trains, buses, cars, where the mobile relay station in the vehicle can provide better coverage and throughput by ensuring wireless backhaul links to the network in one embodiment of the invention. The mobile station(s) can enjoy seamless or uninterrupted connection with the wireless network even when it is moving.

Figure 2A:
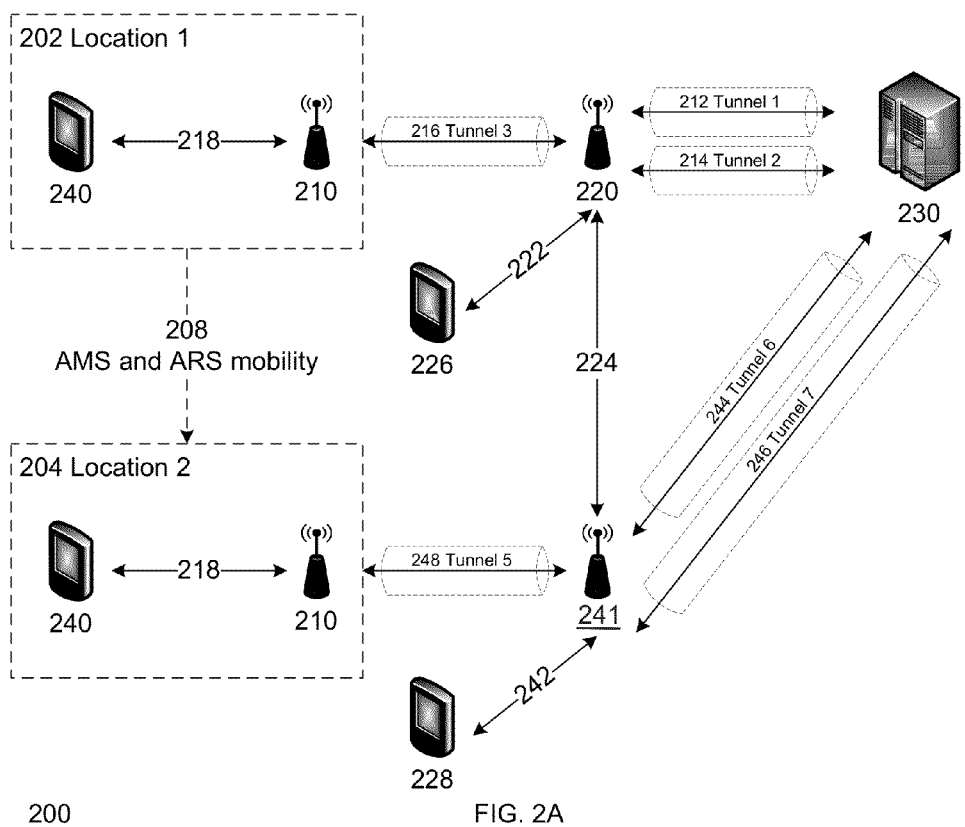
FIG. 2A illustrates a usage scenario in accordance with one embodiment of the invention.

FIG. 2A illustrates a usage scenario 200 in accordance with one embodiment of the invention. The usage scenario 200 illustrates a scenario where a Advanced Relay station (ARS) is able to switch communication from one Advanced Base Station (ABS) to another ABS when the ARS is moved from one location to another location and the ARS is able to maintain logical connection and context with its attached Advanced Mobile Station (AMS). In the usage scenario 200, the wireless network is aware of the presence of the ARS and it treats the ARS as a regular advanced base station although the communications are routed through the ABS.

For example, in one embodiment of the invention, in the location 1 202, the ARS 210 is coupled with the ABS 220 via the GRE communication tunnel 3 216. The ABS 220 is termed as, but is not limited to, the source, the initial, or the serving, ABS 220 to indicate that it is the ABS coupled with the ARS 210 prior to the handover procedure in one embodiment of the invention. The ARS 210 is coupled with the AMS 240 via the wireless communication link 218. In one embodiment of the invention, an station identification (STID) of the AMS 240 and a flow identification (FID) are used to identify the wireless communication link 218 between the AMS 240 and the ARS 210.

The serving ABS 220 is coupled with the Access Serving Network (ASN) gate way (GW) 230 via the GRE communication tunnels 1 212 and 2 214 in one embodiment of the invention. The serving ABS 220 is coupled with the AMS 226 in one embodiment of the invention.

In one embodiment of the invention, when the ARS 210 and the AMS 240 are moved to another location 2 204, a handover procedure or mechanism is performed to transfer or switch the communication of the ARS 210 with the serving ABS 220 to the target ABS 241. The handover procedure is initiated by the ARS 210 in one embodiment of the invention. In another embodiment of the invention, the handover procedure is initiated by the serving ABS 220. In one embodiment of the invention, the ARS 210 and/or the serving ABS 220 use one or more factors including, but are not limited to, signal strength of the wireless link, loading of the ARS 210, loading of the serving ABS 220, interference signals, operational requirements of the network and the like, to determine whether the handover procedure is required to be initiated.

For example, in one embodiment of the invention, the ARS 210 initiates the handover procedure to the target ABS 241 when the received signal strength of the serving ABS 220 falls below an acceptable threshold. In another embodiment of the invention, the serving ABS 220 initiates the handover procedure of the ARS 210 when the received signal strength of the ARS 210 falls below an acceptable threshold. In another embodiment of the invention, when the resources of the serving ABS 220 are overloaded or insufficient to support the ARS 210, the serving ABS 220 initiates the handover procedure of the ARS 210. In yet another embodiment of the invention, the ARS 210 and/or the serving ABS 220 can receive user input to initiate the handover procedure of the ARS 210. One of ordinary skill in the relevant art will readily appreciate that other methods or scenarios to initiate the handover procedure of the ARS 210 can be used without affecting the workings of the invention and these other methods or scenarios shall not be described.

When the handover procedure is initialized to perform the switching of the communication of the ARS 210 with the serving ABS 220 to the target ABS 241, the serving ABS 220 triggers or initiates the handover signaling to the target ABS 241 for the handover of the ARS 210. In one embodiment of the invention, the handover signaling messages are delivered on the relay link 8 (R8) 224 between the serving ABS 220 and the target ABS 241 as "MAC-L2-XFER" Medium Access Control (MAC) management messages.

In one embodiment of the invention, the target ABS 241 receives the handover signaling and determines that the handover request is for the ARS 210. The target ABS 241 performs an authentication key (AK) context retrieval and data path pre-registration for the ARS 210 with the ASN GW 230. The target ABS 241 sends a request for per-AMS tunnel context information together with the handover response to the serving ABS 220. The piggyback of the request for the per-AMS tunnel context information allows the target ABS 241 to request the information required to re-establish the data path for the AMS(s) attached to the ARS 210 in one embodiment of the invention.

After receiving the handover response and the request for per-AMS tunnel context information from the target ABS 241, the serving ABS 220 sends a handover confirmation and piggybacks the per-AMS tunnel context information to the target ABS 241. In one embodiment of the invention, the per-AMS tunnel context information includes, but is not limited to, a tunnel mapping function for mapping between the GRE communication tunnel and the relay forwarding headers on the ARS radio bearer, quality of service (QoS) parameters associated with each GRE communication tunnel and any other information required to perform mapping of the GRE communication tunnels between the target ABS 241 and the ARS 210.

In one embodiment of the invention, the target ABS 241 uses the per-AMS tunnel context information to establish the GRE communication tunnels 6 212 and 7 214 with the ASN GW 230. In another embodiment of the invention, the GRE communication tunnels 6 212 and 7 214 do not need to be established: the existing GRE communication tunnels 1 212 and 2 214 can be re-used and the ASN GW 230 updates its tunnel forwarding port to the target ABS 241.

In one embodiment of the invention, a GRE communication tunnel 5 248 is established between the target ABS 241 and the ARS 210. The target ABS 241 updates the new tunnel mapping at the ARS 210 over a relay link 8 (R8) after the ARS 210 has completed the network re-entry in one embodiment of the invention. After the network re-entry, a Layer 3 (L3) control path is established between the ARS 210 and the ASN GW 230 to update the configuration of the ARS 210 in an Operations, Administration, and Maintenance (OME) server. The target ABS 241 updates the physical layer (PHY) parameters for the ARS 210 and the operation of the ARS 210 is resumed in one embodiment of the invention. The data path for the AMS 240 is resumed and it is unaware that the ARS 210 has performed a handover operation from the serving ABS 220 to the target ABS 241. This allows a seamless operation of the AMS 240 when both the AMS 240 and the ARS 210 are mobile.

In the usage scenario 200, the ASN GW 230 is aware that the AMS 240 is attached or communicatively coupled with the ARS 210. This allows the ASN GW 230 to retain or reuse the same AMS 240 context in the case of an intra Mobility Management Entity (MME) handover scenario. This is possible because from the point of view of the ASN GW 230, the AMS 240 does not really move as it is still connected to the same ARS 210 and the ABS only acts as a router for the ARS 210 to forward AMS packets. The handover of the ARS 210 is only concerned about how to re-establish a wireless backhaul between the ARS 210 and the target ABS 241 in one embodiment of the invention.

In one embodiment of the invention, the AMS 240, the ARS 210, the source ABS 220, the target ABS 241 and the ASN GW 230 communicate at least in part in accordance with communication standards such as, but are not limited to, Institute of Electrical and Electronic Engineers (IEEE) 802.11(a), 802.11(b), 802.11(g), 802.11(h), 802.11(j), 802.11(n), 802.16-2004, 802.16(e), 802.16(m) and their variations and evolutions thereof standards, and/or proposed specifications, although the scope of the invention is not limited in this respect as they may also be suitable to transmit and/or receive communications in accordance with other techniques and standards.

The illustration in FIG. 2A is not meant to be limiting and other usage scenarios can be used without affecting the workings of the invention. For example, in one embodiment of the invention, more than one AMS is connected to the ARS 210. In another embodiment of the invention, more than two GRE communication tunnels are established for the serving BS 260.

Figure 2B:
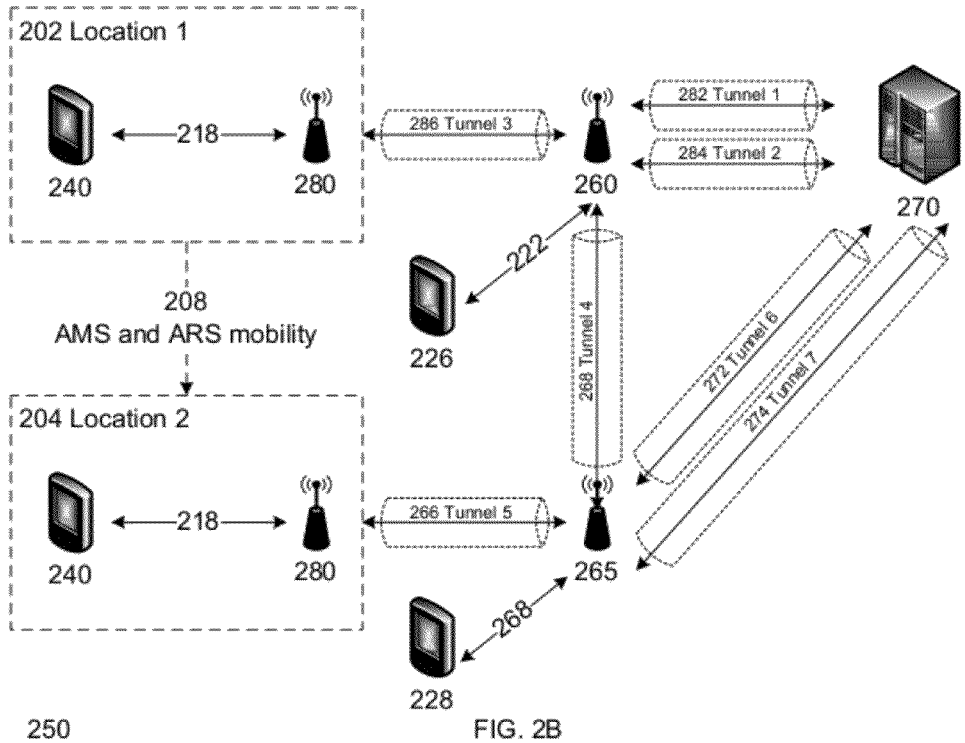
FIG. 2B illustrates a usage scenario in accordance with one embodiment of the invention.

FIG. 2B illustrates a usage scenario 250 in accordance with one embodiment of the invention. The usage scenario 250 illustrates a scenario where an ARS is able to switch communication from one ABS to another ABS when the ARS is moved from one location to another location and the ARS is able to maintain logical connection and context with its attached AMS. In the usage scenario 250, the wireless network, i.e., the ASN GW 270, is not aware of the presence of the ARS and the ABS executes a proxy function so that all AMS(s) associated with the ARS appear to the wireless network as being connected via the ABS. After the ARS 280 has performed a successful handover from the serving ABS 260 to the target ABS 265, the ASN GW 270 is updated with the context of the AMS 240. This is because from the point of view of the ASN GW 270, the point of attachment of the AMS 240 is switched to the target ABS 265 in one embodiment of the invention.

In one embodiment of the invention, the handover mechanism of the ARS 280 is initiated when the ARS 280 moves beyond an acceptable range from the serving ABS 260. In another embodiment of the invention, the handover mechanism of the ARS 280 is initiated as described earlier for the usage scenario 200. When the handover mechanism of the ARS 280 is initiated, the serving ABS 260 initiates handover signaling to the target ABS 265 for the handover of the ARS 280.

In one embodiment of the invention, the serving ABS 260 is aware that the AMS 240 is attached via the ARS 280 and it interprets that the handover of the ARS 280 implicitly requires that a new backhaul for the AMS 240 is required at the target ABS 265. A relay link (R8) handover signaling takes place for the ARS 280 and it prompts the target ABS 265 to establish the radio bearers for the ARS 280. The serving ABS 260 sends a handover request to the target ABS 265 in one embodiment of the invention. The handover request includes, but is not limited to, a request for a proxy mapping function for per AMS data and control bearers to perform the proxy function at the target ABS 265, a mapping function to perform relay link 6 (R6) bearer to radio bearer mapping. The request of context information in the handover request allows the target ABS 265 to identify the AMS packets within the ARS bearers.

In one embodiment of the invention, the target ABS 265 performs admission control to decide whether it should accept or decline the handover request of the ARS 280. If the admission control is successful, i.e., the handover request is accepted, the target ABS 265 first performs a proxy function for the AMS 240 control and data packets to strip and reconstruct new headers for them. Second, the target ABS 265 maps the AMS GRE communication tunnels to the Radio Bearers that it has accepted for the handover procedure.

In one embodiment of the invention, the handover procedure of the ARS 280 establishes the GRE communication tunnel 4 268 between the serving ABS 260 and the target ABS 265. The GRE communication tunnel 4 268 allows the AMS 240 data and control packets to be handled as if they were ARS 280 data packets. The target ABS 265 performs the proxy and bearer mapping function to map the received AMS 240 packets into the appropriate ARS 280 radio bearer via the GRE communication tunnel 5 266.

In one embodiment of the invention, the target ABS 265 notifies the completion of the handover procedure to the ASN GW 270 by transmitting a path switch request. The path switch request enables a direct data path to be setup with the ASN GW 270 in the form of the GRE communication tunnels 6 272 and 7 274. The target ABS 265 notifies the serving ABS 260 to release the old resources allocated for the ARS 280 and the AMS 240. In one embodiment of the invention, the target ABS 265 is able to establish new GRE communication tunnels with the ASN GW 270 of the AMS 240 without requiring any action of the AMS 240. In one embodiment of the invention, the AMS 240 and the ARS 280 logical links are maintained, i.e., by retaining and reusing the logical communication channels and context between the AMS 240 and ARS 280.

In one embodiment of the invention, the GRE communication tunnel 1 282 cannot be reused for the handover of the ARS 280 as the network, i.e., ASN GW 270, is aware of the new data path to be established for the AMS 240. In one embodiment of the invention, the ASN GW 270 treats all ARS-associated AMS as coming from the target ABS 265.

In one embodiment of the invention, the AMS 240, the ARS 280, the serving ABS 260, the target ABS 265 and the ASN GW 270 communicate at least in part in accordance with communication standard such as, but is not limited to, the Third Generation Partnership Project (3GPP) Long Term Evolution (LTE) standard and their variations and evolutions thereof standards, and/or proposed specifications, although the scope of the invention is not limited in this respect as they may also be suitable to transmit and/or receive communications in accordance with other techniques and standards. The terminology used in the usage scenario 250 reflects IEEE 802.16 standard and WiMAX Forum Network Working Group (NWG) specifications in one embodiment of the invention.

When the AMS 240, the ARS 280, the serving ABS 260, the target ABS 265 and the ASN GW 270 communicate at least in part in accordance with 3GPP LTE standard, one of ordinary skill in the relevant art will readily appreciate the required entity mapping such as, but is not limited to, the AMS mapped to an User Equipment (UE), the ARS mapped to a Relay Node (RN), the BS mapped to an enhanced node B (DeNB), the ASN mapped to Serving Gateway and MME, the ASN mapped to a MME, the GRE communication tunnel is mapped to a General Packet Radio Service (GPRS) Tunneling Protocol (GTP) and the like.

The illustration in FIG. 2B is not meant to be limiting and other usage scenarios can be used without affecting the workings of the invention. For example, in one embodiment of the invention, more than one AMS is connected to the ARS 280. In another embodiment of the invention, the AMS 240 performs additional intra-cell hand over with the ARS 280 to refresh their security context in the event that the ARS 280 is unable to retain the logical channels with AMS 240.

The user scenarios 200 and 250 described earlier are not meant to be limiting and any number of AMS(s) and UE(s) can be connected with the ARS and RN respectively. One of ordinary art in the relevant art will readily appreciate how to extend or apply the handover procedure of the ARS or DeNB to an inter-ASN handover scenario and it shall not be described herein.

Figure 3:
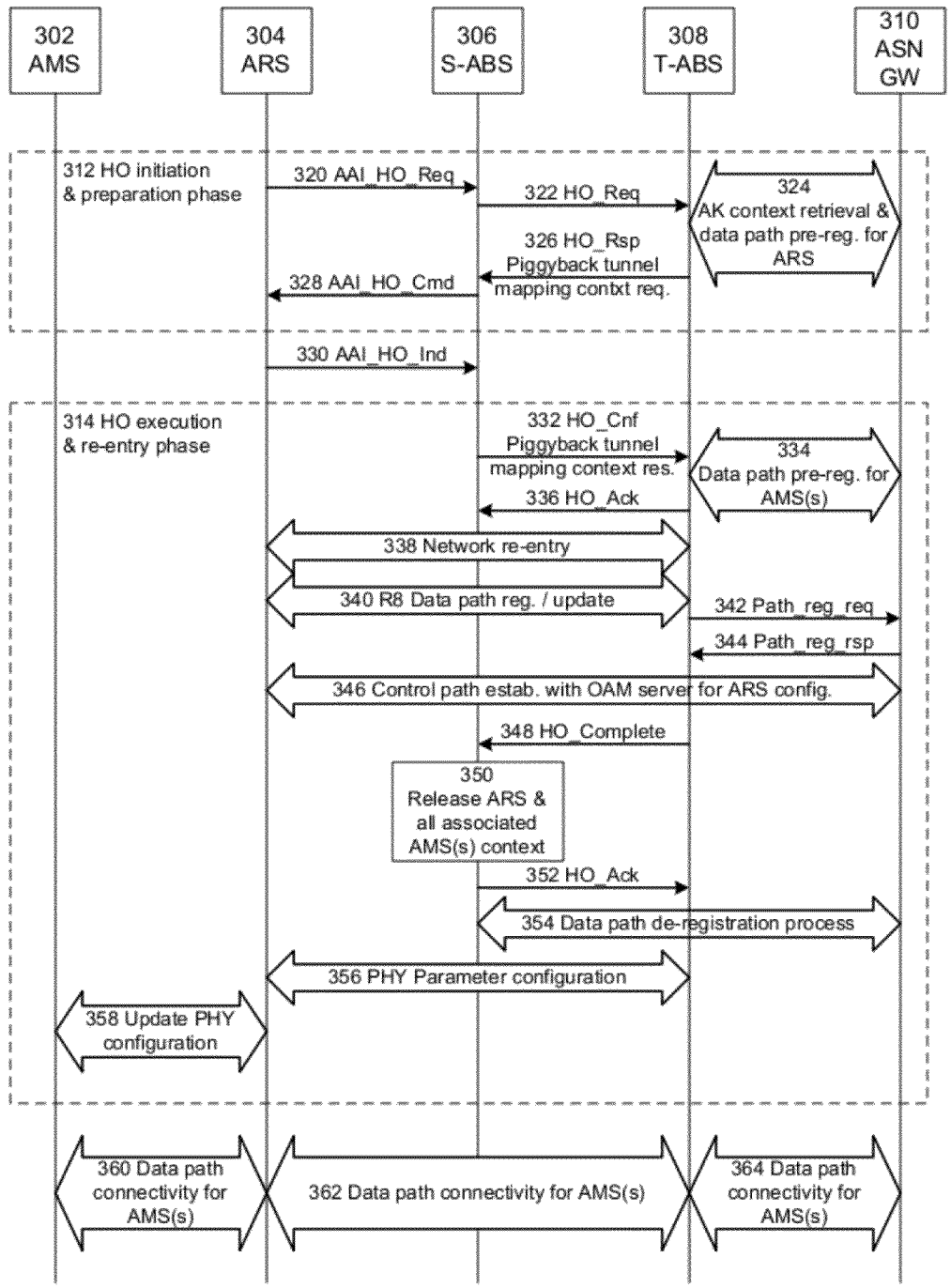
FIG. 3 illustrates a signaling call flow in accordance with one embodiment of the invention.

FIG. 3 illustrates a signaling call flow 300 in accordance with one embodiment of the invention. In one embodiment of the invention, the general flow of a handover procedure or mechanism of an ARS includes, but is not limited to, obtaining the network topology and neighboring ABS parameters, initiating ARS handover to a target ABS (either ARS or ABS initiated), performing network re-entry at the target ABS and configuring the operational parameters of the ARS and/or its associated AMS(s). For clarity of illustration, the signaling call flow is at least compliant in part with the IEEE 802.16m standard.

The signaling call flow 300 illustrates the handover (HO) initiation and preparation phase 312 and the HO execution and re-entry phase 314 in one embodiment of the invention. For clarity of illustration, the ARS 304 is assumed to initiate the handover procedure in the signaling call flow 300 in one embodiment of the invention. In the handover (HO) initiation and preparation phase 312, the ARS 304 sends an advanced air interface (AAI) HO request (AAI_HO_Req) message to the serving ABS (S-ABS) 306 in step 320. In one embodiment of the invention, the ARS 304 sends the AAI_HO_Req message with a list of preferred target base stations to the S-ABS 306. In one embodiment of the invention, the list of preferred target base stations is obtained by the ARS 304 when it is obtaining the network topology and neighboring ABS parameters.

The S-ABS 306 receives the AAI_HO_Req message and sends a R8 handover request (HO_Req) message to the target ABS (T-ABS) 308 in step 322. In one embodiment of the invention, the target ABS 308 classifies the AAI_HO_Req message to identify that the handover is required for the ARS 304. In response to the AAI_HO_Req message, the T-ABS 308 obtains the authentication key (AK) context and initiates data path pre-registration for the ARS 304 with the ASN GW 310 over a R6 link in step 324.

If the handover for the ARS 304 is accepted, T-ABS 308 sends a R8 handover response (HO_Rsp) message to the S-ABS 306 in step 326. In one embodiment of the invention, the T-ABS 308 piggybacks a tunnel mapping context request with the HO_Rsp in step 326. The tunnel mapping context request includes, but is not limited to, a request for a tunnel mapping table, a request for per-tunnel QOS parameters and the like. The information sought in the tunnel mapping context request allows the T-ABS 308 to perform a mapping of the GRE communication tunnel and the relay forwarding headers on the ARS radio bearer, and set the required QoS parameters associated with each GRE communication tunnel.

In step 328, the S-ABS 306 sends an AAI HO command (AAI_HO_Cmd) message over the relay link to the ARS 304 to inform the ARS 304 about the handover decision. If the handover decision indicates that the handover request has been accepted, the ARS 304 starts ranging at the T-ABS 308 to initiate the network re-entry procedure. The ARS 304 sends an AAI HO indication (AAI_HO_Ind) message after the ranging is completed in step 330. In one embodiment of the invention, the parameter HO Reentry Mode is set to 1 in the AAI_HO_Cmd message sent to the ARS 304. When the parameter HO Reentry Mode is set to 1, it indicates that the S-ABS 306 ensures that the data path is available for the ARS-related AMSs until the ARS 304 completes network re-entry at the T-ABS 308 in one embodiment of the invention.

In the HO execution and re-entry phase 314, the S-ABS 306 sends an HO confirmation (HO_Cnf) message to the T-ABS 308 in step 332. In one embodiment of the invention, the S-ABS 306 piggybacks the tunnel mapping context response together with the HO_Cnf message in step 332. The information in the tunnel mapping context response allows the T-ABS 308 to perform data path pre-registration in step 336 for the AMS 302 with the ASN GW 310 over a R6 link. The T-ABS 308 sends a HO acknowledgement (HO_Ack) in step 336 after the data path pre-registration for the AMS 302 is completed.

In one embodiment of the invention, the ASN GW 310 reuses the same GRE communication tunnel for the service flow and updates its tunnel forwarding port from the S-ABS 306 to the T-ABS 308. The T-ABS 308 establishes the data path directly with ARS 304 during the network re-entry in step 338.

In another embodiment of the invention, the ASN GW 310 set up a new GRE communication tunnel with the T-ABS 308 for the corresponding service flow and breaks the existing GRE communication tunnel with the S-ABS 306. The ARS 304 performs a network re-entry with the T-ABS 308 and performs a data path registration or update with the T-ABS 308 to update the new tunnel mapping context in step 340. After the data path registration procedure is completed, the T-ABS 308 sends a path registration request (Path_reg_req) message to the ASN GW 310 in step 342. The ASN GW 310 sends a path registration response (Path_reg_rsp) message in step 344 to the T-ABS 308.

To facilitate the ARS 304 to support relay operation at the target ABS 308, a Layer 3 (L3) control path from the ASN GW 310 to the ARS 304 is established in step 346 to update the configuration from the OAM server. After the L3 control path is established, the T-ABS 308 sends a HO complete (HO_Complete) in step 348 to the S-ABS 306. The HO_Complete message from the T-ABS 308 indicates the completion of the network re-entry. The S-ABS 306, on receiving the HO_Complete, discards all resource information for the ARS 304 and the AMS 302 in step 350. The context of the ARS 304 and the AMS 302 includes, but is not limited to, all MAC context, all MAC state machines, all outstanding buffered PDUs, and the like.

After the S-ABS 306 discards all resource information for the ARS 304 and the AMS 302, it sends a HO acknowledgment (HO_Ack) to the T-ABS 308 in step 352. The S-ABS 306 initiates a data path de-registration process in step 354 with the ASN GW 310 for any data path that is no longer required after the handover. The ARS 304 receives the physical layer (PHY) operational parameters in step 356 from the T-ABS 308. If any change in the operational parameters is required, the ARS 304 updates the PHY configuration of the AMS 302 in step 358.

The data path connectivity of the AMS 302 with the ASN GW 310 is re-established without any help from the AMS 302. The seamless handover of the ARS 304 allows mobility of a group of users in high speed vehicles such as trains and buses. The ARS is able to service the AMS(s) in the high speed vehicle and the ARS performs a handover procedure to another neighboring ABS as required. From the perspective of the AMS(s), the point of attachment with the ARS remains the same and the connectivity for the AMS(s) is preserved while the ARS handover procedure is performed transparent to the AMS(s) in one embodiment of the invention.

Figure 4A:
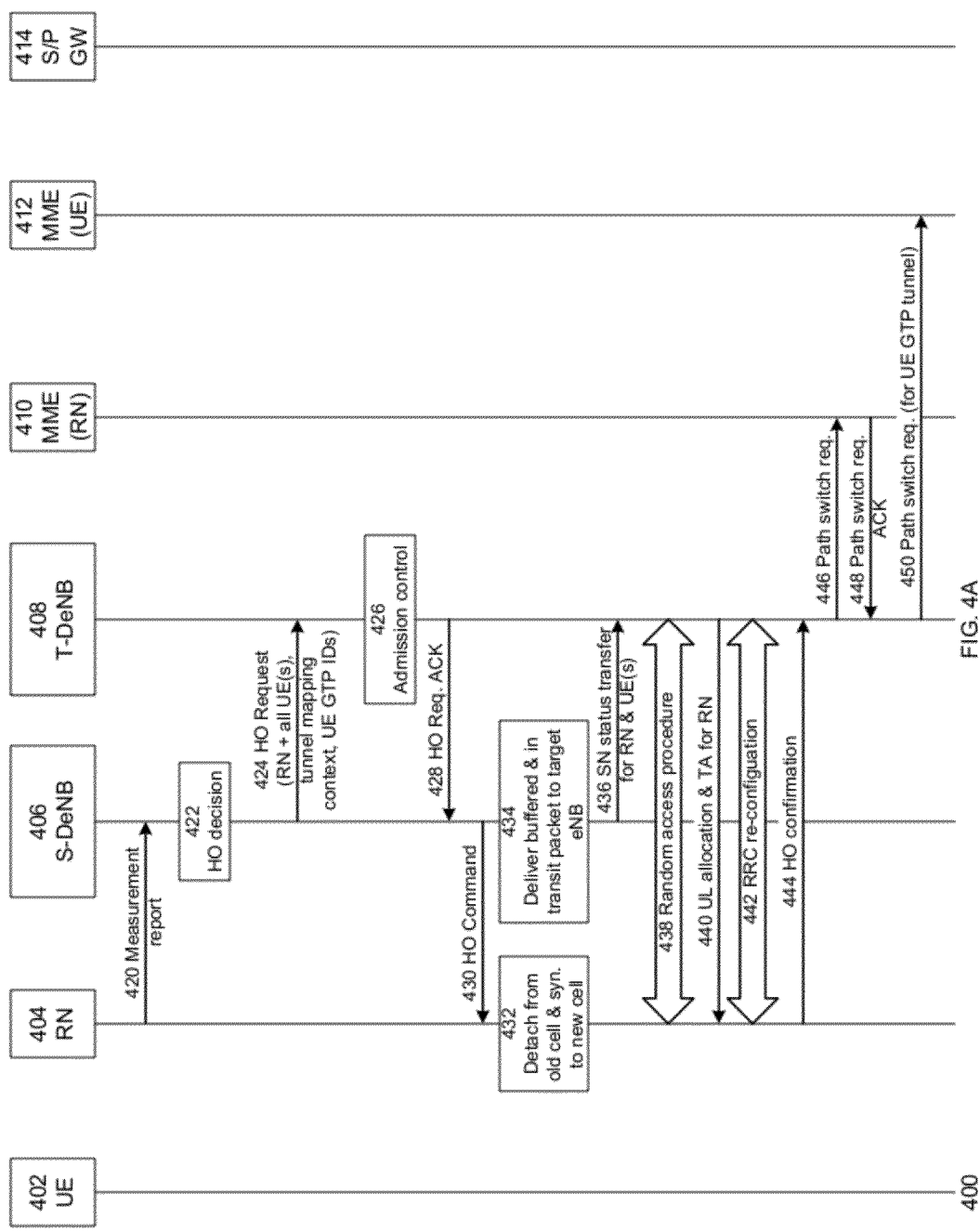
FIG. 4A illustrates a signaling call flow in accordance with one embodiment of the invention.

FIG. 4A illustrates a signaling call flow 400 in accordance with one embodiment of the invention. FIG. 4A illustrates a signaling call flow 400 that is at least compliant in part with the 3GPP LTE standard. The relay node (RN) 404 sends a measurement report in step 420 to the serving donor evolved Node-B (S-DeNB) 406. The S-DeNB 406 uses the measurement report to make a HO decision in step 422. If the HO decision is accepted, the S-DeNB 406 sends a HO request in step 424 to the target donor evolved Node-B (T-DeNB) 408.

In one embodiment of the invention, the S-DeNB 406 sends the tunnel mapping context of the RN 404 and the UE 402 and the UE 402 GTP identifications (IDs) together with the HO request in step 424. The T-DeNB 408 performs an admission control in step 426 to decide if the HO request 426 should be accepted and sends a HO request acknowledgement (HO Req. ACK) message to the S-DeNB 406 in step 428. The HO Req. ACK message indicates whether the HO request has been accepted in one embodiment of the invention.

If the HO request has been accepted, the S-DeNB 406 sends a HO command in step 430 to the RN 404. After receiving the HO command, the RN 404 detaches from the old cell associated with the S-DeNB 406 and synchronizes with the new cell of the T-DeNB 408 in step 432. The S-DeNB 406 delivers all buffered and in-transit packets to the T-DeNB 408 in step 434. The S-DeNB 406 sends the sequence number (SN) status transfer 436 for the RN 404 and the UE 402 in step 436.

The RN 404 and the T-DeNB 408 initiates a random access procedure in step 438. After the random access procedure is completed, the T-DeNB 408 performs an uplink (UL) allocation and sets up a tunnel agent (TA) for the RN 404 in step 440. The RN 404 and the T-DeNB 408 perform a Radio Resource Control (RRC) re-configuration in step 442 in one embodiment of the invention. After the RRC re-configuration is done, the RN 404 sends the T-DeNB 408 a HO confirmation message in step 444.

After the HO confirmation is received by the T-DeNB 408, the T-DeNB 408 sends a path switch request in step 446 to the MME 410 that serves the RSN 410. The MME 410 sends a path switch response in step 448 to the T-DeNB 408. The T-DeNB 408 sends a path switch request in step 450 for the UE GTP communication tunnel to the MME 412 that serves the UE 412. In one embodiment of the invention, a single MME performs both the functionality of the MME 410 and the MME 412.

Figure 4B:
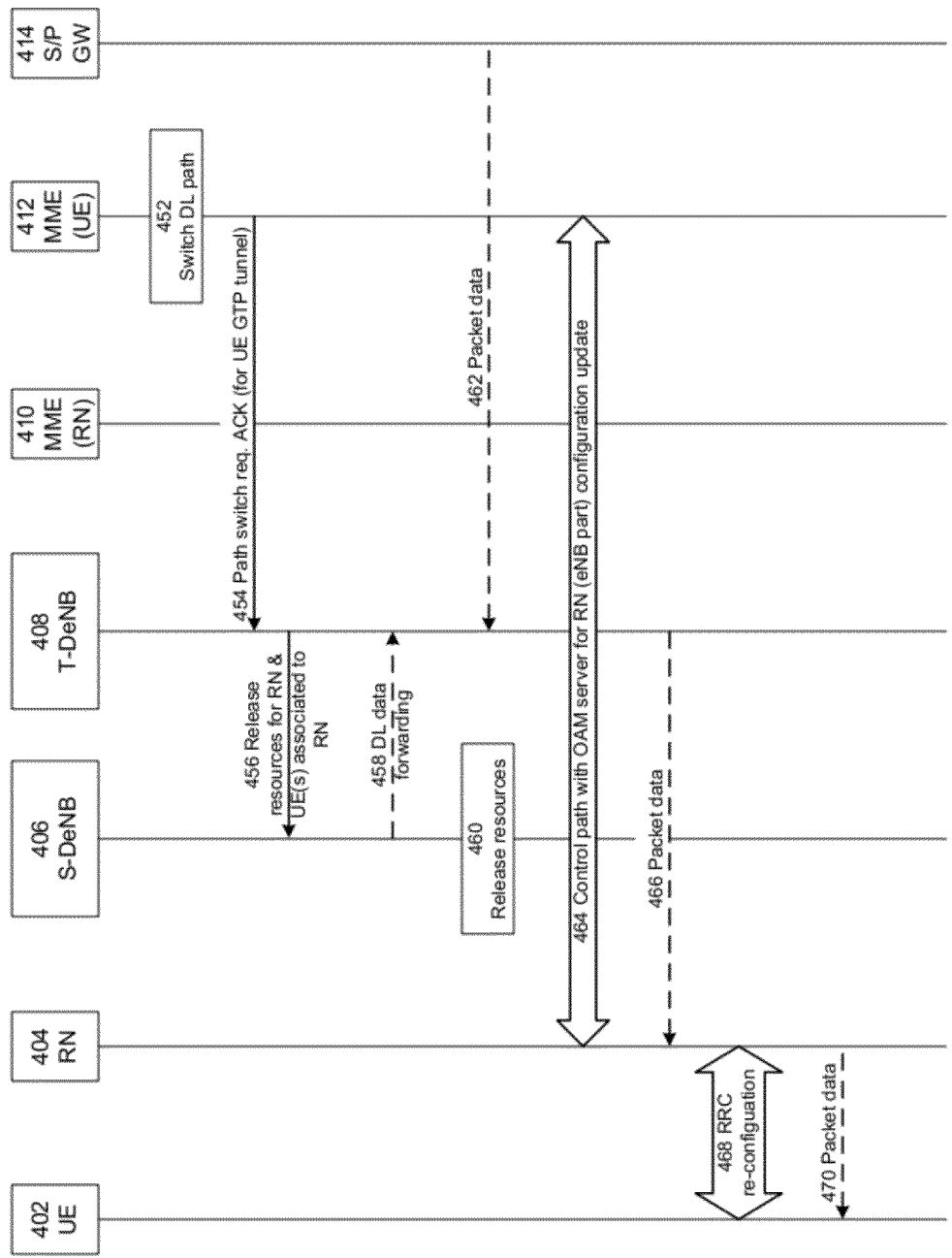
FIG. 4B illustrates a signaling call flow in accordance with one embodiment of the invention.

FIG. 4B illustrates a continuation of the signaling call flow 400 in accordance with one embodiment of the invention. The MME 412 switches the downlink (DL) path in step 452 and sends a path switch request acknowledgement in step 454 to the T-DeNB 408. The T-DeNB 408 sends a request in step 456 to the S-DeNB 406 to releases the resources associated with the RN 404 and the UE 402 that is associated with the RN 404.

The S-DeNB 406 receives the request and performs a DL data forwarding of any pending data from the RN 404 in step 458. The S-DeNB 406 releases the resources associated with the RN 404 and the UE 402 in step 460 in one embodiment of the invention. The S/P GW 414 sends data packets for the UE 402 to the T-DeNB 408 in step 462. The RN 404 establishes a control path with the OAM server to update the configuration of the RN 404 for its eNB functionality in step 464.

After the control path is established, the T-DeNB 408 sends the data packets for the UE 402 to the RN 404 in step 466. The RN 404 and the T-DeNB 408 perform RRC re-configuration in step 468 in one embodiment of the invention. After the RRC re-configuration 468 is done, the RN 404 sends the data packets to the UE 402 in 470.

In one embodiment of the invention, the handover procedure of the ARS or RN re-establishes the wireless backhaul connection with the AMS(s) or UE(s) transparently with the appropriate configuration while maintaining the access link until the handover procedure is completed. If the access link between the ARS and the AMS(s) are not maintained, the AMS(s) may experience a radio link failure during the handover of the ARS when the handover procedure exceeds the allowable time for the handover procedure.

Figure 5A:
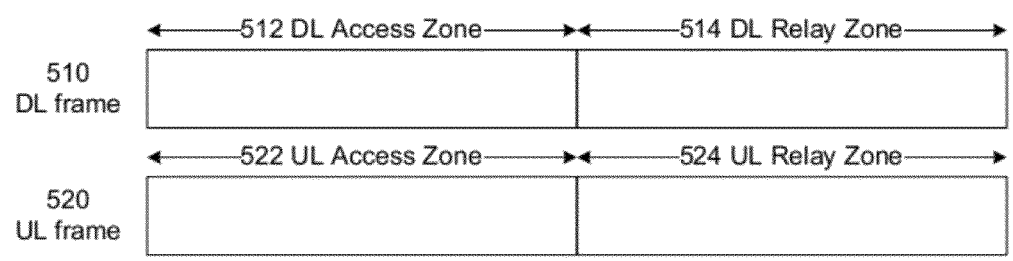
FIG. 5A illustrates a frequency domain division (FDD) frame structure in accordance with one embodiment of the invention.

In one embodiment of the invention, the frame structure used for communication between the target ABS and the ARS is synchronized to achieve the seamless group mobility of the ARS and its associated AMS(s). FIG. 5A illustrates a frequency domain division (FDD) frame structure 500 in accordance with one embodiment of the invention. In one embodiment of the invention, the ARS uses the same Orthogonal Frequency-Division Multiple Access (OFDMA) signal parameters as its serving ABS. The ABS and ARS super frames are time aligned and is made up of the same number of frames and AAI sub frames.

Each ARS super frame has a super frame header (SFH) that has the same location and format as the SFH transmitted by the ABS. The ARS preambles are transmitted synchronously with the super ordinate ABS preambles. In one embodiment of the invention, the ABS and ARS frames are both partitioned into an access and a relay zone. The FDD frame structure 500 has a DL frame 510 and a UL frame 520. The DL frame 510 has a DL access zone 512 and a DL relay zone 514. The UL frame 520 has a UL access zone 522 and a UL relay zone 524.

In one embodiment of the invention, the ABS access zones 512 and 522 are used for communication with the AMS only. The ABS relay zones 514 and 524 can be used for communication with the ARS and/or AMS in one embodiment of the invention. The zone configuration of the access zones 512 and 522 and relay zones 514 and 524 are informed to the ARS by the serving ABS in an ARS configuration message during the ARS network entry phase in one embodiment of the invention.

Figure 5B:
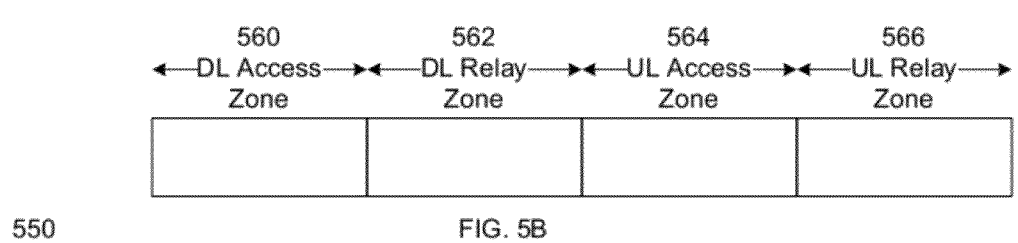
FIG. 5B illustrates a time domain division (TDD) frame structure in accordance with one embodiment of the invention.

FIG. 5B illustrates a time domain division (TDD) frame structure 550 in accordance with one embodiment of the invention. The TDD frame structure 550 has a DL access zone 560, a DL relay zone 562, a UL access zone 564 and a UL relay zone 566. The DL access zone 560, a DL relay zone 562, a UL access zone 564 and a UL relay zone 566 have a similar operation as the DL access zone 512, the DL relay zone 514, the UL access zone 522 and the UL relay zone 524 respectively and shall not be described herein.

In one embodiment of the invention, the ARS or RN uses its relay zone to perform ranging and network re-entry at the target ABS. At the same time, it uses the DL access zone 612 and UL access zone 622 to continue serving the sub-ordinate AMS(s). In one embodiment of the invention, when the relay zone frame configuration at the target ABS is different from the relay zone frame configuration at the serving ABS, the ARS network re-entry procedure, i.e., the establishment of wireless backhaul, at the target ABS may fail. Such a failure may result in a radio link failure in the access link between the ARS and its sub-ordinate AMSs.

To avoid the potential radio link failure in the access link between the ARS and its sub-ordinate AMSs, the ARS needs to know the relay zone sub frames used by the target ABS so that it can synchronize its relay zone configuration with the target ABS to acquire the target ABS in one embodiment of the invention. The ARS continues its ARS mode operation with its associated AMS(s) using the appropriate access zone sub frames to facilitate the wireless backhaul re-establishment at the target ABS.

Figure 6:
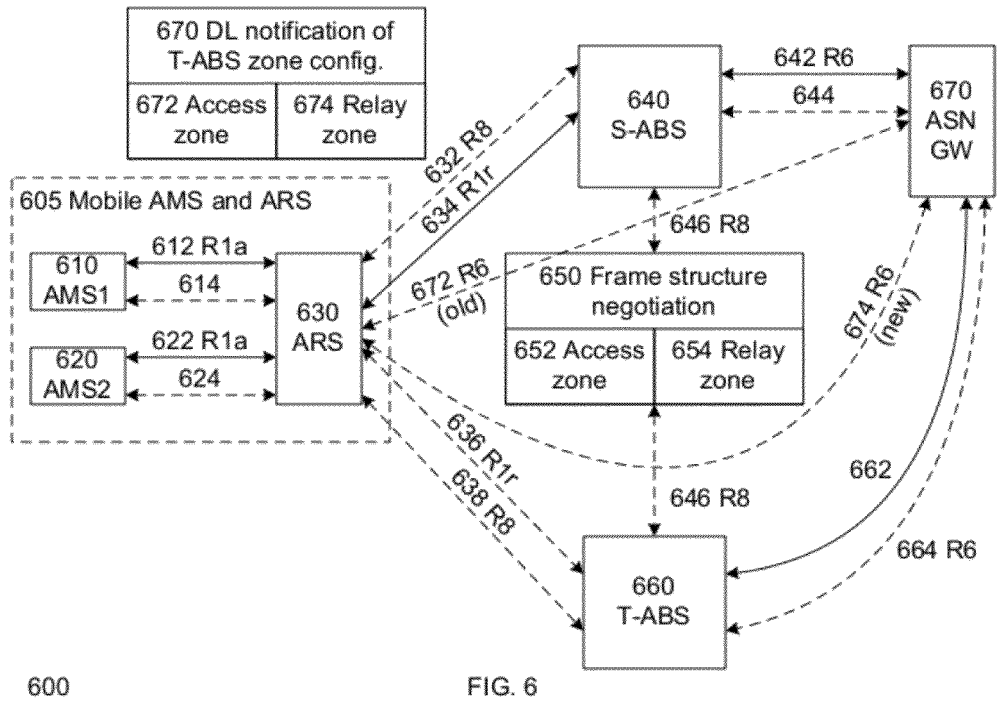
FIG. 6 illustrates a frame structure negotiation in accordance with one embodiment of the invention.

FIG. 6 illustrates a frame structure negotiation 600 in accordance with one embodiment of the invention. FIG. 6 illustrates an ARS 630 that is coupled with the AMS1 610 and the AMS2 620. The ARS 630 has an access link R1a 612 and an access link R1a 622 with the AMS1 610 and the AMS2 620 respectively. The ARS 630 has a control link 614 and 624 with the AMS1 610 and the AMS2 620 respectively. The ARS 630 has a relay link R1r 634 and a control link R8 632 with the serving ABS (S-ABS) 640. The S-ABS 640 is coupled with the ASN GW 670 via the relay link R6 642 and the control link 644.

To enable an in-band relay handover of the ARS 640 from the S-ABS 640 to the target ABS (T-ABS) 660, a frame structure negotiation 650 is performed in one embodiment of the invention. The frame structure negotiation 650 has the negotiated access zone 652 and relay zone 654. For clarity of illustration, a TDM frame structure is used between the T-ABS 660 and the S-ABS 640. In one embodiment of the invention, the ARS 630 ensures that the access link R1a 612 and the access link R1a 622 with the AMS1 610 and the AMS2 620 are properly maintained during the handover procedure.

In one embodiment of the invention, the ARS 630 ensures that the access link R1a 612 and the access link R1a 622 with the AMS1 610 and the AMS2 620 are properly maintained by performing network re-entry at the T-ABS 660 without losing the relay zone configuration. For example, in one embodiment of the invention, the ARS 630 maintains the relay zone configuration by serving the AMS1 610 and the AMS2 620 in the UL and DL access zones and the network re-entry is performed in the UL and DL relay zones.

In one embodiment of the invention, when the S-ABS 640 is required to perform handover of the ARS 630 to the T-ABS 660, it requests the zone configuration of the access and relay zones from the T-ABS 660 using a HO request message. In the HO response, the T-ABS 660 sends the configuration of the sub-frames that it is using for the DL and UL relay and access zones in one embodiment of the invention. This is illustrated by the DL notification of the T-ABS 660 zone configuration 670. In another embodiment of the invention, the S-ABS 640 directly obtains the zone configuration of the access and relay zones of the T-ABS 660 from the OAM server. In another embodiment of the invention, the S-ABS 640 directly obtains the zone configuration of the access and relay zones of the T-ABS 660 from the T-ABS 660 via other dedicated R8 signaling. In one embodiment of the invention, the S-ABS 640 piggybacks the zone configuration of the access and relay zones of the T-ABS 660 to the ARS 630 with the HO command message.

Figure 7A:
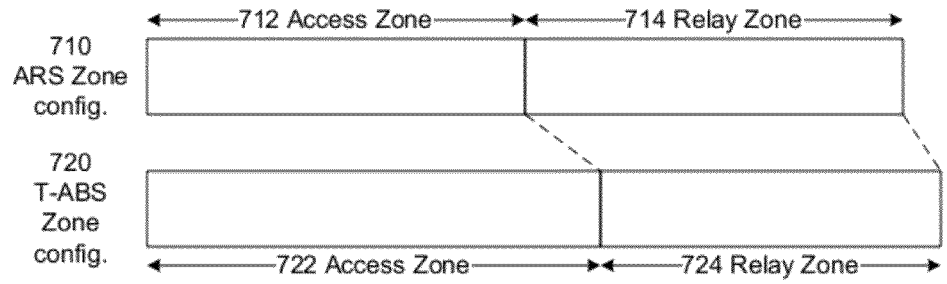
FIG. 7A illustrates a zone configuration scenario in accordance with one embodiment of the invention.

In one embodiment of the invention, the ARS 630 receives a zone configuration of the access and relay zones of the T-ABS 660 that is different from the configuration of the access and relay zones of the ARS 630. FIG. 7A illustrates a zone configuration scenario 700 in accordance with one embodiment of the invention. The zone configuration scenario 700 illustrates the ARS zone configuration 710 and the T-ABS zone configuration 720. In the zone configuration scenario 700, the T-ABS has a smaller set of sub frames that are allocated for relay zone operation compared to the ARS, i.e., the relay zone 724 of the T-ABS is smaller than the relay zone 714 of the ARS.

In the zone configuration scenario 700, the ARS performs network re-entry with the T-ABS in the relay zone in one embodiment of the invention. The ARS uses the T-ABS's relay zone configuration for network re-entry while using its current access zone 712 configuration for serving its associated AMS(s). Although the ARS may waste some sub-frames by using the T-ABS's relay zone configuration for network re-entry, this minimizes the handover impact on the AMS(s) associated with the ARS. When the handover of the ARS is completed, the ARS triggers a frame structure reconfiguration to realign its configuration with the T-ABS in one embodiment of the invention. In another embodiment of the invention, when the T-ABS has the same number of sub frames that are allocated for relay zone operation compared to the ARS, the ARS uses the T-ABS's relay zone configuration for network re-entry while using its current access zone 712 configuration for serving its associated AMS(s).

Figure 7B:
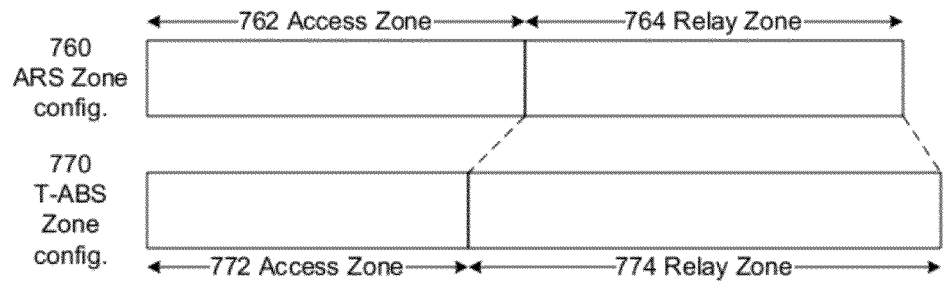
FIG. 7B illustrates a zone configuration scenario in accordance with one embodiment of the invention.

FIG. 7B illustrates a zone configuration scenario 750 in accordance with one embodiment of the invention. The zone configuration scenario 750 illustrates the ARS zone configuration 760 and the T-ABS zone configuration 770. In the zone configuration scenario 750, the T-ABS has a larger set of sub frames that are allocated for relay zone operation compared to the ARS, i.e., the relay zone 774 of the T-ABS is larger than the relay zone 764 of the ARS.

In the zone configuration scenario 750, the T-ABS performs the network re-entry with the available sub-frames of the ARS in one embodiment of the invention. The ARS ensures that the super frame transmitted in the access zone has the same location and format as the super frame header transmitted by the T-ABS in one embodiment of the invention. In one embodiment of the invention, the ARS reconfigures its frame structure to ensure that the AMS Hybrid Automatic Repeat Request (HARQ) timing and other parameters are pre-aligned before executing the handover procedure.

In another embodiment of the invention, the T-ABS obtains the serving ABS's frame structure and allows the ARS to use its original frame structure to access its radio resource i.e. limiting the ARS network reentry to a subset of its relay zone. This can be achieved with the assumption that the DL/UL frames are always aligned notwithstanding how the relay and access zones are partitioned. Once the handover procedure is completed, the T-ABS commands the ARS to update its frame structure configuration and the ARS in turn updates the frame structure to all connected AMS(s).

In one embodiment of the invention, the negotiating and notification of the frame structure used by the T-ABS at the ARS, wireless backhaul re-establishment can be achieved transparent to the ARS associated AMS(s). This reduces the likelihood of the AMS experiencing a radio link failure during the handover of the ARS.

In another embodiment of the invention, the AMS(s) associated or attached to the ARS is forced into a sleep mode until the handover of the ARS is completed at the T-ABS. In one embodiment of the invention, the sleep time is configured or set to a known value. For example, in one embodiment of the invention, the sleep time is set to the time for the ranging initiation deadline plus some additional offset. One of ordinary skill in the relevant art will readily appreciate how to set a suitable sleep time and it will not be described herein.

In yet another embodiment of the invention, an Entry Before Break (EBB) procedure is implemented in the ARS. When the EBB is enabled in the ARS, the ARS maintains the relay link with the serving ABS until it completes the network re-entry at the target ABS. The AMSs and UEs illustrate multi-radio devices capable of heterogeneous wireless communication by accessing a plurality of wireless networks and/or wired networks. In one embodiment of the invention, the AMS and the UE include, but are not limited to, wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices.

The AMSs and UEs may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless communication links.

For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Figure 8:
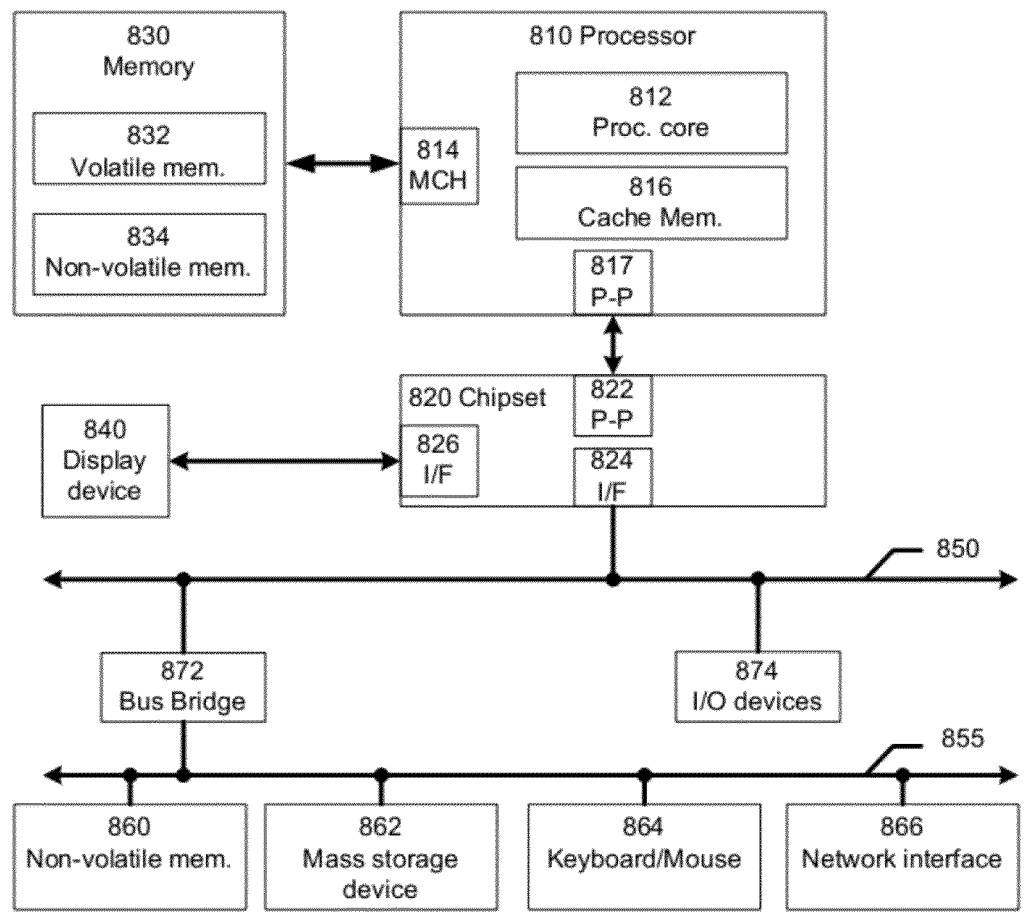
FIG. 8 illustrates a system to implement the methods disclosed herein in accordance with one embodiment of the invention.

FIG. 8 illustrates a system 800 to implement the methods disclosed herein in accordance with one embodiment of the invention. The system 800 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 800 used to implement the methods disclosed herein may be a system on a chip (SOC) system.

The processor 810 has a processing core 812 to execute instructions of the system 800. The processing core 812 includes, but is not limited to, pre-fetch logic to fetch instructions, decode logic to decode the instructions, execution logic to execute instructions and the like. The processor 810 has a cache memory 816 to cache instructions and/or data of the system 800. In another embodiment of the invention, the cache memory 816 includes, but is not limited to, level one, level two and level three, cache memory or any other configuration of the cache memory within the processor 810.

The memory control hub (MCH) 814 performs functions that enable the processor 810 to access and communicate with a memory 830 that includes a volatile memory 832 and/or a non-volatile memory 834. The volatile memory 832 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 834 includes, but is not limited to, NAND flash memory, phase change memory (PCM), read only memory (ROM), electrically erasable programmable read only memory (EEPROM), or any other type of non-volatile memory device.

The memory 830 stores information and instructions to be executed by the processor 810. The memory 830 may also stores temporary variables or other intermediate information while the processor 810 is executing instructions. The chipset 820 connects with the processor 810 via Point-to-Point (PtP) interfaces 817 and 822. The chipset 820 enables the processor 810 to connect to other modules in the system 800. In one embodiment of the invention, the interfaces 817 and 822 operate in accordance with a PtP communication protocol such as the Intel® QuickPath Interconnect (QPI) or the like. The chipset 820 connects to a display device 840 that includes, but is not limited to, liquid crystal display (LCD), cathode ray tube (CRT) display, or any other form of visual display device.

In addition, the chipset 820 connects to one or more buses 850 and 855 that interconnect the various modules 874, 860, 862, 864, and 866. Buses 850 and 855 may be interconnected together via a bus bridge 872 if there is a mismatch in bus speed or communication protocol. The chipset 820 couples with, but is not limited to, a non-volatile memory 860, a mass storage device(s) 862, a keyboard/mouse 864 and a network interface 866. The mass storage device 862 includes, but is not limited to, a solid state drive, a hard disk drive, an universal serial bus flash memory drive, or any other form of computer data storage medium. The network interface 866 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 8 are depicted as separate blocks within the system 800, the functions performed by some of these blocks may be integrated within a single semiconductor circuit or may be implemented using two or more separate integrated circuits. For example, although the cache memory 816 is depicted as a separate block within the processor 810, the cache memory 816 can be incorporated into the processor core 812 respectively. The system 800 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A relay node comprising:
first circuitry to:
send a handover request to a source enhanced Node B (eNodeB);
receive a handover command message that is to indicate whether the handover request is accepted;

perform ranging of a target eNodeB in response to an indication of the handover command message that the handover request is accepted;
detach from a first cell of the source eNodeB;
synchronize with a second cell of the target eNodeB;
perform network re-entry with the target eNodeB;
perform data path registration or update with the target eNodeB;
perform a random access procedure with the target NodeB;
receive an uplink allocation and timing advance for the relay node;
perform a Radio Resource Control (RRC) reconfiguration with the target eNodeB;
send a handover confirmation to the target eNodeB;
receive one or more physical (PHY) layer operational parameters of the target eNodeB;
determine if one or more user equipment (UE) is to be updated based on the received one or more PHY layer operational parameters;
update respective PHY configurations of the one or more UE using the received one or more PHY layer operational parameters based on the determination;
establish a control path with an Operations, Administration, and Maintenance (OAM) server to update configuration the relay node; and
perform a RRC reconfiguration for each of the one or more UE; and
second circuitry, coupled with the first circuitry, to maintain logical communication with the one or more UE during the switch of communication with the source eNodeB to the target eNodeB.

2. The relay station of claim 1, wherein the relay node, while in an on-powered state, is operable at least in part with one of Institute of Electrical and Electronics Engineers (IEEE) 802.16m standard, and a 3rd Generation Partnership Project (3GPP) Long Term Evolution standard.

3. One or more non-transitory computer-readable media comprising computing device-executable instructions, wherein the instructions, in response to execution by a relay station, cause the relay station to:

send a handover request to a source enhanced Node B (eNodeB);
receive a handover command message that is to indicate whether the handover request is accepted;
performing ranging of a target eNodeB in response to an indication of the handover command message that the handover request is accepted;
detach from a first cell of the source eNodeB;
synchronize with a second cell of the target eNodeB;
perform network re-entry with the target eNodeB;
perform data path registration or update with the target eNodeB;
perform a random access procedure with the target eNodeB;
receive an uplink allocation and timing advance for the relay station;
perform a Radio Resource Control (RRC) reconfiguration with the target eNodeB;
send a handover confirmation to the target eNodeB;
receive one or more physical (PHY) layer operational parameters of the target eNodeB;
determine if one or more user equipment (UE) associated with the relay station is to be updated based on the received one or more PHY layer operational parameters;
update respective PHY configurations of the one or more UE using the received one or more PHY layer operational parameters based on the determination;
establish a control path with an Operations, Administration, and Maintenance (OAM) server to update configuration of the relay station;
perform an RRC reconfiguration for each of the one or more UE; and
maintain logical communication with the one or more UE during the switch of communication with the source eNodeB to the target eNodeB.

4. The one or more non-transitory computer-readable media of claim 3, wherein the instructions are compliant at least in part with one of Institute of Electrical and Electronics Engineers (IEEE) 802.16m standard, and a 3rd Generation Partnership Project (3GPP) Long Term Evolution standard.

* * * * *